United States Patent Office 3,082,074
Patented Mar. 19, 1963

3,082,074
METHOD FOR IMPROVING PLANT GROWTH
USING SYNTHETIC ION EXCHANGE RESINS
AND THE PRODUCT THEREOF
Melvin F. Handley, Freeport, and Keith G. Seymour,
Lake Jackson, Tex., assignors to The Dow Chemical
Company, Midland, Mich., a corporation of Delaware
No Drawing. Filed Dec. 11, 1958, Ser. No. 779,576
8 Claims. (Cl. 71—1)

This invention is concerned with plant growth and particularly to methods and compositions for improving the fertility of soil. It has special reference to the nutrition of plants in pots or containers where the plants are grown indoors, as in homes and in greenhouses but is not limited thereto.

Many types of earth soils are substantially useless for the growth of plant and vegetable life therein. Many of these soils are deficient in the nutrient elements required for plant growth. In others the nutrients are present in such form that they are unavailable for use, or the release of the elements by chemical or microbial activity is not sufficiently rapid to support intensive plant growth. It has been the practice in plant culture, therefore, to fertilize soil to eliminate nutrient status as a growth-limiting factor. Some of the plant nutrients can be added in the form of organic materials such as tankage, cottonseed meal, sewage sludge, manure and the like. While these materials do decompose in the soil and thereby release nitrogen, phosphorus and sulfur in a form capable of being utilized by plants, this class of materials has the disadvantage of depending on microbiological action for the release of nutrients for plant use. The result is that nutrients may be released more rapidly than needed for slow-growing plants or small plants; on the other hand nutrients may not be released rapidly enough for large or rapid-growing plants which require large amounts of nutrients. Inasmuch as all of the nutrients absorbed by plants are of inorganic nature, they must be supplied by the addition of salts or a mixture of salts and organic materials, known generally as fertilizers. Many of the nutrients required by plants are inorganic in nature and must be supplied by the addition of salts. While some degree of success has been obtained by adding fertilizer chemicals or solutions of fertilizer chemicals to soil, such treatments have the disadvantage of the necessity for controlling the amount of fertilizer used. It is well known that in practice, excessive salt concentration or improper balance of the salts frequently results in "fertilizer or chemical burn" or "salt injury" to the plants. Furthermore, addition of salt mixtures are subject to leachout. Thus, application of fertilizer chemicals must be controlled, and repeated applications of the proper proportions of the chemicals must be made during the growth period. Besides the disadvantages inherent in such controlled operations, there are economic factors involved, such as added cost arising from the necessity of repeated mixing, measuring and distributing mixtures of fertilizer chemicals with water. Such problems are multiplied in horticulture operations of ornamental plants where year-round culture of different types of plants are carried out and where fertilizer compositions must be modified to meet such factors as stage of growth of plants, light, pH of soil, temperature, and so on.

Furthermore, in greenhouse operations where the soil is reused, operators are frequently plagued with salt accumulation requiring suspension of operations while beds are refitted for growing operations.

It has been discovered according to the present invention that growth of plants in soil may be improved by supplying a plurality of nutrients to soil wherein all added nutrients are in chemical combination with synthetic water-insoluble ion exchange resins. It has further been discovered that by adding the nutrients in chemical combination with water-insoluble synthetic ion exchange resins that all nutrients necessary for prolonged plant growth under intensive culture may be added in a single operation and the necessity for controlled repeated addition of fertilizer is avoided. It has also been found that the flowering characteristics of plants may be improved by supplying a plurality of nutrients to soil wherein all added nutrients are in chemical combination with synthetic ion exchange resins. Still further, it has been found that by adding the nutrients according to the present invention, improved growth of plants is achieved that is superior to and more uniform than that generally obtained by controlled repeated addition with a fertilizer solution. Additionally, it has been found that the nutrients are resistant to leaching and the soil is adapted to further growth of plants without further fertilization. As a further advantage it is found that nutrients having been supplied according to the present invention, the soil is adaptable to repeated intensive culture with infrequent replenishing of nutrients with a nutrient salt solution whereby the nutrient ions thus supplied become chemically combined with the resin originally supplied to the soil. This is of particular advantage in commercial greenhouse soil where the same soil is used repeatedly for many growing operations. Other advantages will become evident from the following specification and claims.

By "soil" is meant a medium capable of supporting some plant growth without added nutrients and is inclusive of mineral soils which have a predominance of inorganic constituents and organic soils which may contain as high as 95 percent organic matter. Furthermore, by "soil," as herein employed, is meant such growth medium as has a cation exchange capacity of at least 2 milliequivalents per 100 grams. The unit milliequivalent is defined as "one milligram of hydrogen or the amount of any other ion that will combine with or displace it." The exchange capacity of soil may be determined by saturating the soil with 1 Normal neutral ammonium acetate, extracting the exchangeable ammonium with a salt solution such as potassium chloride or sulfate, and determining the ammonium content of the extract by distillation and titration of the ammonia present as more completely described on pages 187–8 of "Soil and Plant Analysis," by C. S. Piper, Interscience Publishers, Inc., New York, 1950; or determining the ammonium content of the extract by Nesslerization as more completely described by Peech et al., "Methods of Soil Analysis," United States Department of Agriculture, Circular No. 757, 1947, pages 9–10.

Included in "soil" as herein employed are mixtures of natural soil as above defined with non-growth supporting materials frequently added to soil to improve texture, porosity, etc. such as sand, charcoal, expanded silicate, leaf mold, sawdust, and the like. Typical of such mixture encompassed in the present invention is commercial potting soil, a representative potting soil being a mixture of mineral soil, peat, sand and leaf mold. Other additaments, as set forth above, are also frequently included in a potting soil mixture.

The expression "synthetic ion exchange resin" as herein employed means a polymeric material having the capacity to exchange ions with the surrounding medium and embraces natural materials which have been modified by chemical treatment to produce ion exchange properties as well as completely synthetic material. It is inclusive of weak and strong cation and anion exchangers as the terms are known in the art. An example of natural material modified by chemical treatment to provide exchange properties is sulfonated coal. Examples of completely synthetic ion exchange resins are those having a polymeric skeleton such as phenol-formaldehyde, polystyrene, polyolefins, olefin-maleic anhydride copolymers, polyoxyalkylene and polyalkyleneimine compounds and the like and containing acidic and basic groups capable of exchanging cations and anions. Cation exchangers generally contain the groups —OH, —COOH, —PO(OH)$_2$ or —SO$_3$H. It is understood that the above are the fundamental groups present on the exchanger and that the exchanger may have another cation in place of the hydrogen, said hydrogen or cationic group being replaceable by the particular cation to be employed in carrying out the present invention. Anion exchangers generally contain primary, secondary or tertiary amino groups or quaternary ammonium groups. Anion exchangers having amino groups are those capable of forming addition complexes with an acid having the desired anionic group. Quaternary ammonium anion exchangers have a hydroxyl or other anionic group which is exchangeable with the particular anion to be employed in carrying out this invention.

"Water-insoluble" as employed in the expression "water-insoluble synthetic ion exchange resin" refers to resins having such physical properties that they do not form either true or colloidal solutions in water. In the practice of this invention, it is desirable that the resin be of 100 mesh size or greater, that is, that substantially all of the resin is of a size such as to be retained on a standard sieve having 100 meshes per inch.

According to the present invention, the nutrients are added in chemical combination with water-insoluble synthetic ion exchange resins in at least an amount normally required during an entire growth period. The resin mixtures are added to soil to supply one of the following combinations of nutrients (1) nitrogen, phosphorus and potassium (usual components of fertilizers), (2) all macronutrients, or (3) all essential nutrients (macronutrients+micronutrients). The essential nutrient elements include the macronutrients: nitrogen, phosphorus, sulfur, potassium, calcium and magnesium; and the micronutrients: iron, zinc, copper, manganese, molybdenum and boron. For some plants it is also of benefit to supply sodium and chlorine in addition.

Since substantially all soils require the addition of nitrogen, phosphorus and potassium, the preferred embodiment of this invention embraces the provision of these nutrients in chemical combination with synthetic ion exchange resins. The nitrogen is supplied as nitrate in chemical combination with an anion exchange resin, although a portion of the nitrogen supplied may be as ammonium in chemical combination with a cation exchange resin. Generally, when ammonium is employed together with nitrate as a source of nitrogen, it is preferable that only up to one-half of the nitrogen be supplied as ammonium. The phosphorus is supplied as orthophosphate in chemical combination with an anion exchange resin. By "orthophosphate" is meant the mono-, di- and trivalent radical of orthophosphoric acid: $H_2PO_4^-$, $HPO_4^=$ or $PO_4^\equiv$, respectively. Usually the resin carries a mixture of these radicals. The potassium is supplied in chemical combination with a cation exchange resin. A mixture of these resins is intimately admixed with soil in amounts sufficient to supply a weight concentration in the soil of at least 300 parts per million each of nitrogen, phosphorus and potassium calculated as nitrogen, phosphorus pentoxide and potassium oxide. The preferred range depends on the type of soil being treated.

The preferred range of added nutrients for the various types of soil is as follows:

| Soil type | Nitrogen (p.p.m.) | Phosphorus pentoxide (p.p.m.) | Potassium oxide (p.p.m.) |
| --- | --- | --- | --- |
| Sandy | 300–1,500 | 300–1,500 | 300–1,000 |
| Loam | 500–3,000 | 500–3,000 | 500–1,500 |
| Clay | 700–4,000 | 700–4,000 | 600–2,000 |

P.p.m. as above and hereafter employed signifies parts by weight per million parts by weight of soil.

Many soils require the addition of all macronutrients. In the administration of macronutrients, potassium, magnesium and calcium are added in chemical combination with a cation exchange resin; and nitrogen, sulfur and phosphorus are added as nitrate, sulfate and orthophosphate, respectively, in chemical combination with an anion exchange resin. In a method for supplying all macronutrients, the nitrogen, phosphorus and potassium are supplied at the same rate as would be employed if only these nutrients were to be supplied, and the same substitution of ammonium for nitrate may be made as previously set forth. Calcium is added in amounts as high as 70 percent of the total equivalents of cations added; magnesium is added in amounts as high as 30 percent of the total equivalents of cation added; and sulfate is added in amounts as high as 60 percent of the total equivalents of anions added. Calcium and sulfate may be added in larger amounts but no benefit is obtained thereby and such practice is considered undesirable from an economic standpoint.

The exact weight or volume of ion exchange resin bearing nutrients to be added to soil depends on the particular resin employed and may be readily determined from the known exchange capacity of the resin employed. The total capacity of the resin is generally expressed in milliequivalents per gram dry weight or milliequivalents per milliliter of water-swollen resin.

$$\frac{\text{Amount of cation or anion nutrient desired in milliequivalents}}{\text{Capacity of resin}} = \text{Amount of resin to be employed}$$

From this relationship the exact amount of nutrient charged resin required to supply the desired concentration in the soil may be readily calculated.

In a particular embodiment of the present invention directed to greenhouse soil and potting mixtures which may be referred to as "potting soil matrix" the contributions of nutrients by such soil matrix is negligible and all macronutrients or at least all except sulfur must be supplied to said soil matrix. For such application it is desirable that the nutrients be supplied in chemical combination with water-insoluble synthetic ion exchange resin in such amounts that the final composition of said matrix contains at least 500 p.p.m. of potassium oxide as exchangeable potassium, 500 p.p.m. of calcium oxide as exchangeable calcium, 200 p.p.m. of magnesium oxide as exchangeable magnesium, 500 p.p.m. of phosphorus pentoxide as exchangeable orthophosphate, 200 p.p.m. of sulfur trioxide as exchangeable sulfate and bisulfate, and 500 p.p.m. of nitrogen with up to one-half of the nitrogen as exchangeable ammonium with the remainder being exchangeable nitrate. The minimum amount of nutrients to be supplied in chemical combination with water-insoluble synthetic ion exchange resin is in such amounts that the final composition of said matrix contains at least 375 p.p.m. of potassium oxide as exchangeable potassium, 500 p.p.m. of calcium oxide as exchangeable calcium, 150 p.p.m. of magnesium oxide as exchangeable magnesium, 300 p.p.m. of phosphorus pentoxide as exchangeable orthophosphate and 300 p.p.m. of nitrogen with up to one-half of the nitrogen as exchangeable ammonium and the remainder as exchangeable nitrate.

In the administration of all essential nutrients, the macronutrients are administered as set forth above and the micronutrients are supplied by adding the following preferred mixture in an amount of 0.5 gram per kilogram of soil.

| Micronutrient resin component: | Percent by weight |
|---|---|
| Fe-cation exchange resin | 39 |
| Mn-cation exchange resin | 19 |
| Cu-cation exchange resin | 2 |
| Zn-cation exchange resin | 2 |
| $B_4O_7$-anion exchange resin | 19 |
| $MoO_4$-anion exchange resin | 19 |

The cations in the above micronutrient composition are combined with the resin in the divalent form: $Fe^{++}$, $Mn^{++}$, $Cu^{++}$ and $Zn^{++}$. The anions in the above micronutrient composition are combined with the resin as $B_4O_7^=$ and $MoO_4^=$.

The resin mixture to be employed in practicing this invention may be prepared by methods commonly known in ion exchange technology. These methods are described in "Dowex: Ion Exchange," a publication of The Dow Chemical Company, 1958, pages 18–22.

The following examples illustrate the invention but are not to be construed as limiting.

EXAMPLE 1

Five inch pots each containing 1 kilogram of commercial potting soil (cation exchange capacity of 10 milliequivalents per 100 grams), were fertilized with nitrogen, phosphorus and potassium by intimately mixing the soil with a mixture of anion and cation exchange resins bearing said nutrients in chemical combination therewith. The commercial potting soil employed in this and in succeeding examples was composed of five parts mineral soil, two parts peat and one part leaf mold. To improve the watering properties it was mixed with sand in 1:1 or 1:2 volume proportions of soil, the resultant potting soil having a cation exchange capacity of about 10 and 6.7 milliequivalents per 100 grams, respectively. The nitrogen was supplied as $NO_3$-Dowex 2, the phosphorus as orthophosphate-Dowex 2 and the potassium as K-Dowex 50. (Dowex 2 is a commercial quaternary ammonium anion exchange resin; Dowex 50 is a commercial sulfonic acid cation exchange resin.) Varying amounts of the 50–100 mesh resins were added to supply varying concentrations of the nutrients in soil. Four replications were made for each concentration.

For fertilized check operations, similar pots each containing 1 kilogram of soil were fertilized with commercial "5–10–5" and "8–8–8" fertilizer compositions by intimately mixing said fertilizer with soil in amounts sufficient to supply the same concentration of the elements in the soil as was supplied by the resin composition. In this and subsequent commercial fertilizer compositions, the values indicate the available components as follows: $N$—$P_2O_5$—$K_2O$. For non-fertilized checks no nutrient was added to the soil.

The fertilized and non-fertilized pots were then planted with tomato plants of about 2 inches in height bearing the first true leaves and the plants allowed to grow in the greenhouse which was maintained at about 75°–80° F. and 40 to 80 percent relative humidity for 46 days. At the end of this period the height of the plants was measured and the green weight of the plants determined. The amounts added and the results obtained are set forth in Table I.

Table I

| Amount of nutrient added | | | | | Concentration of added nutrients in weight per million parts by weight of soil | | | Green weight of tomatoes in grams per pot (average of 4 pots) | | |
|---|---|---|---|---|---|---|---|---|---|---|
| Resin (in grams) | | | Commercial fertilizer (in grams) | | | | | | | |
| $NO_3$-Dowex 2 | Orthophosphate-Dowex 2 | K-Dowex 50 | "5–10–5" | "8–8–8" | N | $P_2O_5$ | $K_2O$ | Commercial fertilizer | Resin | Check |
| 0 | 0 | 0 | 0 | 0 | 0 | 0 | 0 | ------ | ------ | 37 |
| 9.5 | 3.8 | 1.7 | 8 | ------ | 400 | 800 | 400 | 57 | 62 | ------ |
| 19.1 | 7.5 | 3.4 | 16 | ------ | 800 | 1,600 | 800 | 30 | 80 | ------ |
| 7.6 | 1.5 | 1.4 | ------ | 4 | 320 | 320 | 320 | 58 | 74 | ------ |
| 15.2 | 3.0 | 2.7 | ------ | 8 | 640 | 640 | 640 | 40 | 72 | ------ |
| 30.5 | 6.0 | 5.4 | ------ | 16 | 1,300 | 1,300 | 1,300 | 14 | 84 | ------ |

EXAMPLE 2

After conclusion of the operation described in Example 1, the soil from the pots initially fertilized with 16 grams of commercial fertilizer or with an amount of resin sufficient to supply the same initial concentration of N, $P_2O_5$ and $K_2O$ was separated from the tomato roots by screening. The soil was then repotted without further treatment and carnation seedlings planted therein. The planted pots were placed in a slat house to provide partial shade but otherwise subject to atmospheric conditions of temperature and pressure, and leaching due to rainfall. After 120 days growth, the plants were topped at 3 inches in height and allowed to regrow and bloom. The latter growth period was approximately 90 days. Bloom records were kept with respect to the number of blooms and green weight of blooms per plant grown from soil initially fertilized with commercial "5–10–5" fertilizer, "8–8–8" fertilizer, and nutrient resin modified soil. The results were as follows:

| Residue soil from application of nutrient as— | Number of blooms per plant | Green weight of blooms per plant (grams) |
|---|---|---|
| "5–10–5 Fertilizer" [1] | 2 | 2.0 |
| "5–10–5 Resin Mixture" [1] | 7.8 | 13.4 |
| "8–8–8 Fertilizer" [2] | 2 | 2.4 |
| "8–8–8 Resin Mixture" [2] | 5 | 7.4 |

[1] Initial concentration of nutrient in soil: 800 p.p.m. N; 1,600 p.p.m. $P_2O_5$; 800 p.p.m. $K_2O$.
[2] Initial concentration of nutrients in soil: 1,300 p.p.m. N; 1,300 p.p.m. $P_2O_5$; 1,300 p.p.m. $K_2O$.

EXAMPLE 3

An operation was carried out in a manner similar to that described in Example 1, wherein commercial potting soil of 6.7 milliequivalents per 100 gram cation exchange capacity was employed. The nitrogen was supplied as $NO_3$-Dowex 2 or $NO_3$-Dowex 3, or as a mixture with $NH_4$-Dowex 50. (Dowex 3 is a commercial amine anion exchange resin.) The phosphorus was supplied as orthophosphate-Dowex 2 or orthophosphate-Dowex 3. The potassium was supplied as K-Dowex 50. Four replications were made for each concentration. Resin particle size was 20–50 mesh.

Checks on soil fertilized with commercial fertilizer and non-fertilized soil were also carried out simultaneously. Fertilizer checks were carried out by mixing commercial "20–20–20" fertilizer with the soil as well as by administering the fertilizer as an aqueous 0.3 percent solution twice weekly subsequent to planting. Non-fertilized soil checks contained no added nutrients.

The pots were planted with tomato plants and the plants allowed to grow as previously described and observations were made after 56 days.

The amounts employed and the results obtained are set forth in Table II.

EXAMPLE 5

Nutrient compositions were prepared as follows:

|  | Equivalent percent | |
|---|---|---|
|  | Cations | Anions |
| Composition I: | | |
| K-Dowex 50 | 20 |  |
| Ca-Dowex 50 | 60 |  |
| Mg-Dowex 50 | 20 |  |
| $NO_3$-Dowex 2 |  | 30 |
| Orthophosphate-Dowex 2 |  | 15 |
| $SO_4$-Dowex 2 |  | 55 |
| Composition II: | | |
| K-Dowex 50 | 50 |  |
| Ca-Dowex 50 | 30 |  |
| Mg-Dowex 50 | 20 |  |
| $NO_3$-Dowex 2 |  | 60 |
| Orthophosphate-Dowex 2 |  | 25 |
| $SO_4$-Dowex 2 |  | 15 |

Composition I was mixed with commercial potting

*Table II*

| Amount of nutrient added | | | | | | | Concentration parts by weight/ million parts by weight of soil | | | Nitrogen (p.p.m.) from— | | Green weight of tomatoes in grams per pot (average of 4 pots) |
|---|---|---|---|---|---|---|---|---|---|---|---|---|
| Resin (in grams) | | | | | | Commercial fertilizer "20–20–20" (in grams) | | | | | | |
| $NO_3$-Dowex 2 | $NO_3$-Dowex 3 | $NH_4$-Dowex 50 | Orthophosphate-Dowex 2 | Orthophosphate-Dowex 3 | K-Dowex 50 |  | N | $P_2O_5$ | $K_2O$ | $NO_3$ | $NH_4$ |  |
| 33 |  |  | 13 |  | 6 |  | 1,400 | 2,800 | 1,400 | 1,400 | 0 | 100 |
| 17 |  | 10 | 13 |  | 6 |  | 1,400 | 2,800 | 1,400 | 700 | 700 | 114 |
| 17 |  |  | 13 |  | 3 |  | 700 | 1,400 | 700 | 700 | 0 | 101 |
| 8 |  | 5 | 13 |  | 3 |  | 700 | 1,400 | 700 | 350 | 350 | 112 |
|  | 20 |  |  | 8 | 6 |  | 1,400 | 2,800 | 1,400 | 1,400 | 0 | 112 |
|  | 10 | 10 |  | 8 | 6 |  | 1,400 | 2,800 | 1,400 | 700 | 700 | 115 |
|  | 10 |  |  | 4 | 3 |  | 700 | 1,400 | 700 | 700 | 0 | 108 |
|  | 5 | 5 |  | 4 | 3 |  | 700 | 1,400 | 700 | 350 | 350 | 111 |
|  |  |  |  |  |  | 7 | 700 | 700 | 700 |  |  | [1] 61 |
| Water with 0.3% solution of commercial "20–20–20" twice weekly |  |  |  |  |  |  |  |  |  |  |  | 97 |
| Unfertilized soil |  |  |  |  |  |  |  |  |  |  |  | 29 |

[1] 1 dead plant.

EXAMPLE 4

An operation was carried out in which six macronutrients were supplied in chemical combination with 20–50 mesh ion exchange resins. The nitrogen, phosphorus and potassium were supplied as previously described and in amounts set forth in Table III. Calcium was supplied as Ca-Dowex 50, magnesium was supplied as Mg-Dowex 50 and sulfur as $SO_4$-Dowex 2. The soil employed was commercial potting soil of 6.7 milliequivalents per 100 gram cation exchange capacity. The pots were planted with tomato plants, the plants allowed to grow as previously described and determinations made after 51 days.

Fertilizer checks with commercial "20–20–20" fertilizer and non-fertilized checks were simultaneously carried out.

The results are set forth in Table III.

soil in an amount of 3.6 percent by weight to provide potting mixture A.

Composition II was mixed with commercial potting soil in an amount of 3.6 percent by weight to provide potting mixture B.

The nutrient compositions of the mixtures were as follows:

| | Parts by weight per million parts by weight of soil | | | | | |
|---|---|---|---|---|---|---|
| | N | $P_2O_5$ | $K_2O$ | CaO | MgO | $SO_3$ |
| Mixture A | 280 | 700 | 660 | 1,150 | 270 | 1,500 |
| Mixture B | 570 | 1,900 | 1,600 | 570 | 270 | 400 |

*Table III*

| Amount of nutrient added | | | | | | | Concentration of added nutrients in parts by weight per million parts by weight of soil | | | | | | Green weight of tomatoes in grams per pot (average of 4 pots) |
|---|---|---|---|---|---|---|---|---|---|---|---|---|---|
| $NO_3$-Dowex 2 | $NH_4$-Dowex 50 | Orthophosphate-Dowex 2 | K-Dowex 50 | Ca-Dowex 50 | Mg-Dowex 50 | $SO_4$-Dowex 2 | N | $P_2O_5$ | $K_2O$ | CaO | MgO | $SO_3$ | |
|  |  |  |  |  |  |  | 0 | 0 | 0 | 0 | 0 | 0 | 71 |
| 6.8 |  | 3.4 | 2.7 | 8.2 | 2.7 | 12.5 | 280 | 700 | 660 | [1] 1,200 | [2] 270 | [3] 1,500 | 144 |
| 13.6 |  | 6.8 | 5.4 | 16.3 | 5.4 | 25.0 | 560 | 1,400 | 1,300 | [1] 2,300 | [2] 540 | [3] 3,000 | 194 |
| 5.7 | 2.7 | 5.7 | 2.0 | 6.8 | 2.0 | 11.4 | [a] 440 | 1,200 | 470 | [4] 950 | [5] 200 | [6] 1,400 | 156 |
| 11.4 | 5.4 | 11.4 | 4.1 | 13.6 | 4.1 | 22.7 | [a] 880 | 2,400 | 940 | [4] 1,900 | [5] 410 | [6] 3,700 | 195 |
| From commercial "20–20–20" |  |  |  |  |  |  | 400 | 400 | 400 |  |  |  | 85 |

[a] 55 percent of nitrogen from $NO_3$-Dowex 2, 45 percent of nitrogen from $NH_4$-Dowex 50.
[1] 60 percent of total cation capacity added.
[2] 20 percent of total cation capacity added.
[3] 55 percent of total anion capacity added.
[4] 50 percent of total cation capacity added.
[5] 15 percent of total cation capacity added.
[6] 50 percent of total cation capacity added.

Pots containing mixture A and mixture B as well as a control containing no added resin composition were planted with 5 rooted cuttings of chrysanthemums per pot. The pots containing mixture A and mixture B were watered daily with plain tap water. The control pot was watered twice weekly with a 0.3 percent "20-20-20" fertilizer solution and with plain tap water on the remaining days. These plants were under the care of a professional chrysanthemum grower and grown under the same environmental and management conditions as his commercial crop.

After 11 weeks, the growth and flowers of the chrysanthemums were compared. It was found that the plants growing in pots containing mixture A and mixture B had larger, more luxuriant blooms than the plants growing in the control pot watered with fertilizer solution.

EXAMPLE 6

Various types of natural soil were modified with a resin mixture. The final modified soil mixture was similar to that of mixture A in Example 5 except that different soils were employed. The modified soils were planted with tomato plants of about 2 inches in height and allowed to grow for 43 days in a greenhouse at a temperature of 75°–80° F. and 40 to 80 percent relative humidity.

As check operation, similar pots of unmodified soil were similarly planted with tomato plants. One series of checks were watered with distilled water; the others were watered with nutrient salt solution of the following composition.

| Salt: | Concentration, millimoles per liter |
|---|---|
| $KNO_3$ | 7.0 |
| $Ca(H_2PO_4)_2$ | 1.5 |
| $MgSO_4$ | 3.0 |
| $CaSO_4$ | 7.5 |

The green weights of tomato tops were determined after 47 days. The results were as follows:

Table IV

| Soil | Green weight in grams per pot (average of 2 pots) | | |
|---|---|---|---|
| | Modified soil | Nutrient solution check | Distilled water check |
| Abilene clay loam | 83 | 40 | 24 |
| Miller clay | 88 | 30 | 14 |
| Clareville fine sandy loam | 76 | 45 | 27 |
| Amarillo fine sandy loam | 105 | 54 | 32 |
| Nacodoches fine sandy loam | 46 | 47 | 27 |
| Yellow podzolic sand | 70 | 58 | 30 |
| Sharkey clay | 60 | 38 | 19 |
| Napier silt loam | 58 | 50 | 28 |
| Pledger silty clay | 97 | 48 | 28 |
| Potting soil (commercial) | 98 | 50 | 24 |

EXAMPLE 7

An operation was carried out in a manner similar to that described in Example 6 except that the various soils were modified by adding 3.6 percent by weight of a resin mixture of the following composition:

| | Parts by weight |
|---|---|
| K-Dowex 50 | 14 |
| $NH_4$-Dowex 50 | 14 |
| $NO_3$-Dowex 2 | 43 |
| Orthophosphate-Dowex 2 | 29 |

The soil modified with the above composition supplied nutrients as follows:

| | Parts by weight per million parts by weight of soil |
|---|---|
| Nitrogen | 1,200 |
| Phosphorus (calculated as $P_2O_5$) | 2,900 |
| Potassium (calculated as $K_2O$) | 940 |

The modified soil was planted with tomato plants, allowed to grow as previously described and the green weights determined after 43 days. Check operations were also carried out as described in Example 6. The results were as follows:

Table V

| Soil | Green weight in grams per pot (average of 2 pots) | | |
|---|---|---|---|
| | Modified soil | Nutrient solution check | Distilled water check |
| Abilene clay loam | 85 | 40 | 24 |
| Miller clay | 68 | 30 | 14 |
| Clareville fine sandy loam | 62 | 45 | 27 |
| Amarillo fine sandy loam | 105 | 54 | 32 |
| Sharkey clay | 44 | 38 | 19 |
| Napier silt loam | 58 | 50 | 28 |
| Pledger silty clay | 97 | 48 | 28 |
| Potting soil (commercial) | 96 | 50 | 24 |

EXAMPLE 8

In separate operations, 3 kilogram amounts of potting soil was modified by the addition of macronutrients in chemical combination with various resins. Nitrogen, phosphorus and potassium were supplied in amounts sufficient to supply the amounts set forth in Table VI. Calcium was added in an amount of 60 percent of cation exchange capacity, magnesium in an amount of 20 percent of cation exchange capacity, and sulfate in an amount of 55 percent of anion exchange capacity. Micronutrients were added as described in column 5 wherein the cation exchange resin was Dowex 50 and the anion exchange resin was Dowex 2. The modified soils were planted with tomato plants and grown as previously described. After 60 days the green weights of tomato tops were determined.

Check operations were carried out as follows: Check (1) soil modified with "12-12-12" fertilizer at a rate of 2 grams per kilogram of soil; check (2) unmodified soil watered with nutrient solution having the same composition as employed in Example 6; and check (3) unmodified soil. The results obtained were as follows:

Table VI

| Cation resin | Anion resin | Parts by weight per million parts by weight of soil | | | | | | Green weight in grams (average of 3 pots) |
|---|---|---|---|---|---|---|---|---|
| | | N | $P_2O_5$ | $K_2O$ | CaO | MgO | $SO_3$ | |
| Dowex 50 | Dowex 2 | 420 | 1,100 | 940 | 1,700 | 400 | 2,200 | 160 |
| Do | Dowex 3 | 420 | 1,100 | 940 | 1,700 | 400 | 2,200 | 159 |
| Do | Dowex 2 | 840 | 2,200 | 1,900 | 3,400 | 800 | 4,400 | 170 |
| Do | Dowex 3 | 840 | 2,200 | 1,900 | 3,400 | 800 | 4,400 | 172 |
| Check (1) | | 240 | 240 | 240 | | | | 108 |
| Check (2) | | | | | | | | 87 |
| Check (3) | | | | | | | | 35 |

EXAMPLE 9

Macronutrients were supplied in chemical combination with various anion and cation exchange resins. Resin supplying nutrients were prepared as follows:

(1) Cation exchange resins were brought into equilibrium with a solution having the following concentration of salts—
  (a) 0.2 N with respect to potassium chloride
  (b) 0.6 N with respect to calcium chloride
  (c) 0.2 N with respect to magnesium chloride
(2) Anion exchange resins were brought into equilibrium with a solution having the following concentration of acids—
  (a) 0.3 N with respect to nitric acid
  (b) 0.15 M with respect to phosphoric acid
  (c) 0.55 N with respect to sulfuric acid and adjusted to pH 4 with ammonium hydroxide.

The equilibrated resins were washed and mixed in amounts sufficient to supply an equal capacity of anion and cation exchange resins.

The mixture of resins was intimately admixed with 1 kilogram of soil, potted, and planted with tomato plants as previously described. The plants were allowed to grow in a slat house and the green weights determined after 60 days.

A check operation was similarly carried out with unfertilized soil. The results obtained were as follows:

*Table VII*

| Cation resin | Anion resin | Green weight of tomato in grams per pot (average of 3 pots) |
|---|---|---|
| Dowex 50 | Dowex 2 | 113 |
| Do | Amberlite IRA-45 | 97 |
| Do | Amberlite IRA-400 | 94 |
| Do | Deacidite | 93 |
| Do | Dowex 3 | 89 |
| Do | Amberlite IR-4B | 87 |
| Permutit Q | Dowex 2 | 84 |
| Zeo-Karb | do | 77 |
| Permutit H-70 | do | 68 |
| Check (unfertilized soil) | do | 19 |

NOTE.—Amberlite IRA-45—Weakly basic anion exchanger, amine exchange group, product of Rohm and Haas Company. Amberlite IRA-400—Strongly basic anion exchanger, polystyrene quaternary amine type, product of Rohm and Haas Company. Amberlite IR-4B—Weakly basic anion exchanger, phenol-formaldehyde type. Permutit Q—A sulfonated styrene-type cation exchange resin having only —$SO_3H$ exchange groups, product of Permutit Company. Zeo-Karb—An organic cation exchanger, a sulfonated coal having —$SO_3H$, —COOH and —OH exchange groups, product of Permutit Company. Deacidite—An aliphatic amine, anion exchange resin, product of Permutit Company. Permutit H-70—A carboxylic acid cation exchange resin, product of Permutit Company.

EXAMPLE 10

In similar operations, calendula plants were grown from seed in commercial potting soil having a cation exchange capacity of about 10 milliequivalents per 100 grams. The nutrients were supplied to one group of plants by modifying the soil prior to planting with a resin mixture, and to the other group by addition of completely soluble, inorganic nutrients to give the same amounts of nutrients as were added in chemical combination with the resins.

The resin mixture employed had the following composition:

Percent by volume
K-Dowex 50 _____ 25
$NH_4$-Dowex 50 _____ 25
Orthophosphate-Dowex 2 _____ 25
$NO_3$-Dowex 2 _____ 25

40 milliliters of this mixture was employed for each resin-treated pot.

The inorganic nutrients were added in the following amounts:

Millimoles per pot
$KH_2PO_4$ _____ 3.7
$K_2HPO_4$ _____ 3.7
$KNO_3$ _____ 7.0
$NH_4NO_3$ _____ 4.0
$NH_4OH$ _____ 14.0

The nutrients were administered in amounts sufficient to supply 410 p.p.m of nitrogen, 530 p.p.m of phosphorus pentoxide and 840 p.p.m. of potassium oxide.

The seeds were allowed to grow to flowering plants in a slat house for 120 days. At the end of this period, the number of flowers and green weight of the vegetative parts of the plants were determined. The results obtained were as follows (average of 4 replications):

| Source of nutrient | Number of flowers per plant | Green weight of plant tops (exclusive of flowers) |
|---|---|---|
| Resins | 14 | 49 |
| Salts | 2 | 14 |

EXAMPLE 11

In similar orperations, comparisons were made on the growth of ornamental plants and flowers in which six macronutrients were supplied (1) as resin mixtures, (2) as nutrient salt solution, and (3) no nutrient added.

The resin mixture employed had the following composition.

Cation mixture: Parts by weight
  K-Dowex 50 _____ 20
  Ca-Dowex 50 _____ 60
  Mg-Dowex 50 _____ 20

Anion mixture:
  $NO_3$-Dowex 2 _____ 30
  Orthophosphate-Dowex 2 _____ 15
  $SO_4$-Dowex 2 _____ 55

Anion and cation mixtures were employed in a 1:1 ratio of chemical equivalents.

The nutrient salt solution had the same composition as that employed in Example 6.

The nutrients were administered in amounts sufficient to supply 170 p.p.m. of nitrogen, 440 p.p.m. of phosphorus pentoxide, 390 p.p.m. of potassium oxide, 690 p.p.m. of calcium oxide, 160 p.p.m. of magnesium oxide, and 900 p.p.m. of sulfur trioxide.

Plants at the seedling or rooted cutting stage were planted and allowed to grow in the greenhouse at 68°–75° F. and 60 to 90 percent relative humidity for 90 days. At the end of this period, the green weights of the various plants were determined. The results obtained are set forth in Table VIII.

*Table VIII*

| Plant variety | Green weight in grams per plant | | |
|---|---|---|---|
| | Nutrient resin treatment | Nutrient salt treatment | Check |
| African violet | 297.0 | 248.0 | 150.0 |
| Calendula | 49.0 | 21.0 | 12.0 |
| Carnation | 53.0 | 23.0 | 9.0 |
| Gerarium | 41.0 | 29.0 | 12.0 |
| Gloxinia | 280.0 | 185.0 | 110.0 |
| Hybiscus | 516.0 | 314.0 | 280.0 |
| Ivy | 1,900.0 | 1,061.0 | 535.0 |

We claim:

1. A potting soil composition comprising (1) a potting soil matrix having a cation exchange capacity of at least 2 milliequivalents per 100 grams and in intimate admixture therewith (2) nutrient-charged, water-insoluble synthetic ion exchange resins, wherein the nutrients potassium, calcium and magnesium are supplied in chemical combination with cation exchange resins, the nutrient phosphorus is supplied as orthophosphate in chemical combination with anion exchange resin, the nutrient nitrogen is supplied in amounts up to one-half as ammonium in chemical combination with cation exchange resin and the remainder as nitrate in chemical combination with anion exchange resin; and wherein the nutrient-charged, water-insoluble synthetic ion exchange resins are supplied in amounts sufficient to provide final weight concentrations in the potting soil composition of at least 375 p.p.m. of potassium calculated as potassium oxide, 500 p.p.m. of calcium calculated as calcium oxide, 150 p.p.m. of magnesium calculated as magnesium oxide, 300 p.p.m. of nitrogen calculated as nitrogen, and 300 p.p.m. of phosphorus calculated as phosphorus pentoxide, wherein p.p.m. is weight concentration in soil matrix in parts per million.

2. A potting soil composition comprising (1) a potting soil matrix having a cation exchange capacity of at least 2 milliequivalents per 100 grams and in intimate admixture therewith (2) nutrient-charged, water-insoluble synthetic ion exchange resins, wherein the nutrients potassium, calcium and magnesium are supplied in chemical combination with cation exchange resins, the nutrient phosphorus is supplied as orthophosphate in chemical combination with anion exchange resin, the nutrient sulfur is supplied as sulfate and bisulfate in chemical combination with anion exchange resin, and the nutrient nitrogen is supplied in amounts up to one-half as ammonium in chemical combination with cation exchange resin and the remainder as nitrate in chemical combination with anion exchange resin; and wherein the nutrient-charged, water-insoluble synthetic ion exchange resins are supplied in amounts sufficient to provide final weight concentrations in the potting soil composition of at least 375 p.p.m. of potassium calculated as potassium oxide, 500 p.p.m. of calcium calculated as calcium oxide, 150 p.p.m. of magnesium calculated as magnesium oxide, 300 p.p.m. of nitrogen calculated as nitrogen, 300 p.p.m. of phosphorus calculated as phosphorus pentoxide and 150 p.p.m. of sulfur calculated as sulfur trioxide, wherein p.p.m. is weight concentration in soil matrix in parts per million.

3. A method for improving the growth of plants in potting soil matrix having a cation exchange capacity of at least 2 milliequivalents per 100 grams which comprises the step of administering to said soil matrix a plurality of nutrients in chemical combination with water-insoluble, synthetic ion exchange resins, wherein the nutrients potassium, calcium and magnesium are supplied in chemical combination with cation exchange resins, the nutrient phosphorus is supplied as orthophosphate in chemical combination with anion exchange resin, the nutrient nitrogen is supplied in amounts up to one-half as ammonium in chemical combination with cation exchange resin and the remainder as nitrate in chemical combination with anion exchange resin; and wherein the nutrient resins are supplied in amounts sufficient to provide final weight concentrations in the potting soil matrix of at least 375 p.p.m. of potassuim calculated as potassium oxide, 500 p.p.m. of calcium calculated as calcium oxide, 150 p.p.m. of magnesium calculated as magnesium oxide, 300 p.p.m. of nitrogen calculated as nitrogen and 300 p.p.m. of phosphorus calculated as phosphorus pentoxide wherein p.p.m. is weight concentration in soil matrix in parts per million.

4. A method for improving the growth of plants in potting soil matrix having a cation exchange capacity of at least 2 milli-equivalents per 100 grams which comprises the step of administering to said soil matrix a plurality of nutrients in chemical combination with water-insoluble, synthetic ion exchange resins, wherein the nutrients potassium, calcium and magnesium are supplied in chemical combination with cation exchange resins, the nutrient phosphorus is supplied as orthophosphate in chemical combination with anion exchange resin, the nutrient sulfur is supplied as sulfate and bisulfate in chemical combination with anion exchange resin and the nutrient nitrogen is supplied in amounts up to one-half as ammonium in chemical combination with cation exchange resin and the remainder as nitrate in chemical combination with anion exchange resin; and wherein the nutrient-charged resins are supplied in amounts sufficient to provide final weight concentrations in the potting soil matrix of at least 375 p.p.m. of potassium calculated as potassium oxide, 500 p.p.m. of calcium calculated as calcium oxide, 150 p.p.m. of magnesium calculated as magnesium oxide, 300 p.p.m. of nitrogen calculated as nitrogen, 300 p.p.m. of phosphorus calculated as phosphorus pentoxide and 150 p.p.m. of sulfur calculated as sulfur trioxide, wherein p.p.m. is weight concentration in soil matrix in parts per million.

5. A method for improving growth of plants and avoiding fertilizer burn of plants in potting soil having a cation exchange capacity of at least 2 milliequivalents per 100 grams, which comprises supplying to said potting soil the nutrients nitrogen, phosphorus and potassium in chemical combination with water-insoluble synthetic ion exchange resins in amounts sufficient to provide weight concentrations in said potting soil of at least 280 parts per million of nitrogen calculated as nitrogen and at least 300 parts per million of each of phosphorus and potassium calculated as phosphorus pentoxide and potassium oxide, respectively.

6. A method for improving growth of plants and avoiding fertilizer burn of plants in potting soil having a cation exchange capacity of at least 2 milliequivalents per 100 grams which comprises supplying all macronutrients in chemical combination with water-insoluble synthetic ion exchange resins wherein the nutrients nitrogen, phosphorus and potassium are supplied in amounts sufficient to provide weight concentrations in said potting soil of at least 300 parts per million of each of said nutrients when calculated as nitrogen, phosphorus pentoxide and potassium oxide, respectively, and wherein calcium and magnesium are added in amounts of as high as 70 percent and 30 percent, respectively, of the total equivalents of cations added, and sulfur calculated as sulfate ion is added in an amount as high as 60 percent of the total equivalents of anions added.

7. A method for improving the growth of plants in potting soil having a cation exchange capacity of at least 2 milliequivalents per 100 grams, which comprises the step of administering to said soil the nutrients nitrogen, phosphorus and potassium in amounts sufficient to provide final weight concentrations in the potting soil of at least 280 parts per million of nitrogen calculated as nitrogen and at least 300 parts per million of each of phosphorus and potassium calculated as phosphorus pentoxide and potassium oxide, respectively, and wherein said nutrients are chemically combined with water-insoluble synthetic ion exchange resins and thereafter are added in said chemical combination with water-insoluble synthetic ion exchange resins to potting soil in the amounts above set forth.

8. A method for improving the growth of plants in potting soil having a cation exchange capacity of at least 2 milliequivalents per 100 grams, which comprises the step of administering to said soil the macronutrients nitrogen, phosphorus, sulfur, potassium, calcium and magnesium wherein all said macronutrients are supplied in chemical combination with water-insoluble synthetic ion exchange resins, and wherein of said macronutrients, nitrogen is added in an amount sufficient to provide a final weight concentration in the potting soil of at least 280 parts per million when calculated as nitrogen, each of phosphorus and potassium are added in amounts sufficient to provide final weight concentrations in the potting soil of at least 300 parts per million when calculated as phosphorus pentoxide and potassium oxide, respectively, calcium and magnesium are added in amounts of as high as 70 percent and 30 percent, respectively, of the total equivalents of cations added, and sulfur calculated as sulfate ion is added in an amount as high as 60 percent of the total equivalents of anions added.

References Cited in the file of this patent

UNITED STATES PATENTS

| | | |
|---|---|---|
| 2,582,194 | Dudley | Jan. 8, 1952 |
| 2,806,773 | Pole | Sept. 17, 1957 |
| 2,828,182 | Cheronis | Mar. 25, 1958 |
| 2,988,441 | Pruit | June 13, 1961 |

OTHER REFERENCES

Soil Science, Arnon et al., vol. 63, No. 3, March 1947 pages 159–182.